US008207989B2

(12) United States Patent
Mei et al.

(10) Patent No.: US 8,207,989 B2
(45) Date of Patent: Jun. 26, 2012

(54) MULTI-VIDEO SYNTHESIS

(75) Inventors: Tao Mei, Beijing (CN); Xian-Sheng Hua, Beijing (CN); Shipeng Li, Beijing (CN); Teng Li, Daejeon (KR)

(73) Assignee: Microsoft Corporation, Redmond, WA (US)

( * ) Notice: Subject to any disclaimer, the term of this patent is extended or adjusted under 35 U.S.C. 154(b) by 733 days.

(21) Appl. No.: 12/334,231

(22) Filed: Dec. 12, 2008

(65) Prior Publication Data

US 2010/0149419 A1    Jun. 17, 2010

(51) Int. Cl.
*H04N 9/74* (2006.01)

(52) U.S. Cl. ........ 345/629; 345/638; 345/641; 348/584; 348/597; 715/723; 715/724; 715/725; 715/726; 725/32; 725/33; 725/34; 725/35; 725/36

(58) Field of Classification Search ............. 345/629, 345/638, 641; 348/584, 597; 715/723–726; 725/32–36
See application file for complete search history.

(56) References Cited

U.S. PATENT DOCUMENTS

| | | | |
|---|---|---|---|
| 5,255,098 A | 10/1993 | Poivet et al. | |
| 5,600,366 A | 2/1997 | Schulman | |
| 5,671,253 A * | 9/1997 | Stewart | 375/316 |
| 5,915,250 A | 6/1999 | Jain et al. | |
| 6,072,542 A * | 6/2000 | Wilcox et al. | 348/722 |
| 6,519,283 B1 | 2/2003 | Cheney et al. | |
| 6,698,020 B1 | 2/2004 | Zigmond et al. | |
| 6,704,930 B1 | 3/2004 | Eldering et al. | |
| 6,718,551 B1 | 4/2004 | Swix et al. | |
| 6,950,623 B2 | 9/2005 | Brown et al. | |
| 7,064,857 B2 | 6/2006 | Parker et al. | |
| 7,206,854 B2 | 4/2007 | Kauffman et al. | |
| 7,209,882 B1 * | 4/2007 | Cosatto et al. | 704/235 |
| 7,246,314 B2 * | 7/2007 | Foote et al. | 715/700 |
| 7,296,231 B2 * | 11/2007 | Loui et al. | 715/723 |
| 7,428,345 B2 | 9/2008 | Caspi et al. | |
| 7,451,099 B2 | 11/2008 | Henkin et al. | |
| 7,707,605 B2 | 4/2010 | Yamada et al. | |

(Continued)

FOREIGN PATENT DOCUMENTS

JP    2006106404    4/2006

(Continued)

OTHER PUBLICATIONS

U.S. Appl. No. 11/767,410, filed Jun. 22, 2007, Hua et al, "Image Advertising System.", 43 pgs.

(Continued)

*Primary Examiner* — Xiao M. Wu
*Assistant Examiner* — Todd Buttram
(74) *Attorney, Agent, or Firm* — Lee & Hayes, PLLC (57) ABSTRACT

Embodiments that provide multi-video synthesis are disclosed. In accordance with one embodiment, multi-video synthesis includes breaking a main video into a plurality of main frames and break a supplementary video into a plurality of supplementary frames. The multi-video synthesis also includes assigning one or more supplementary frames into each of a plurality of states of a Hidden Markov Model (HMM), where each of the plurality of states corresponding to one or more main frames. The multi-video synthesis further includes determining optimal frames in the plurality of main frames for insertion of the plurality of supplementary frames based on the plurality of states and visual properties. The optimal frames include optimal insertion positions. The multi-video synthesis additionally includes inserting the plurality of supplementary frames into the optimal insertion positions to form a synthesized video.

19 Claims, 7 Drawing Sheets

U.S. PATENT DOCUMENTS

| | | | |
|---|---|---|---|
| 2001/0034646 A1 | 10/2001 | Hoyt et al. | |
| 2002/0059591 A1 | 5/2002 | Nakagawa | |
| 2002/0100042 A1 | 7/2002 | Khoo et al. | |
| 2002/0103698 A1 | 8/2002 | Cantrell | |
| 2002/0113815 A1 | 8/2002 | DeGross | |
| 2002/0124251 A1 | 9/2002 | Hunter et al. | |
| 2002/0147637 A1 | 10/2002 | Kraft et al. | |
| 2003/0188308 A1 | 10/2003 | Kizuka | |
| 2003/0191688 A1 | 10/2003 | Prince, III et al. | |
| 2004/0034874 A1 | 2/2004 | Hord et al. | |
| 2004/0045028 A1 | 3/2004 | Harris | |
| 2004/0078188 A1 | 4/2004 | Gibbon et al. | |
| 2004/0093327 A1 | 5/2004 | Anderson et al. | |
| 2004/0117827 A1 | 6/2004 | Karaoguz et al. | |
| 2004/0148221 A1 | 7/2004 | Chu | |
| 2004/0194130 A1 | 9/2004 | Konig et al. | |
| 2004/0204985 A1 | 10/2004 | Gibson et al. | |
| 2004/0221304 A1 | 11/2004 | Sparrell et al. | |
| 2004/0223052 A1 | 11/2004 | Sugano et al. | |
| 2005/0018216 A1 | 1/2005 | Barsness et al. | |
| 2005/0076357 A1 | 4/2005 | Fenne | |
| 2005/0114526 A1 | 5/2005 | Aoyama | |
| 2005/0116965 A1 | 6/2005 | Grunder | |
| 2005/0137958 A1 | 6/2005 | Huber et al. | |
| 2005/0166224 A1 | 7/2005 | Ficco | |
| 2005/0172234 A1 | 8/2005 | Chuchla | |
| 2005/0240580 A1 | 10/2005 | Zamir et al. | |
| 2005/0264703 A1 | 12/2005 | Aoki | |
| 2005/0283793 A1 | 12/2005 | Chiu | |
| 2006/0020961 A1 | 1/2006 | Chiu | |
| 2006/0026013 A1 | 2/2006 | Kraft | |
| 2006/0026628 A1 | 2/2006 | Wan et al. | |
| 2006/0111979 A1 | 5/2006 | Chu | |
| 2006/0128469 A1 | 6/2006 | Willis et al. | |
| 2006/0179453 A1 | 8/2006 | Kadie et al. | |
| 2006/0212350 A1 | 9/2006 | Ellis et al. | |
| 2006/0247037 A1 | 11/2006 | Park | |
| 2007/0019261 A1 | 1/2007 | Chu | |
| 2007/0050253 A1 | 3/2007 | Biggs et al. | |
| 2007/0055983 A1 | 3/2007 | Schiller et al. | |
| 2007/0061204 A1 | 3/2007 | Ellis et al. | |
| 2007/0067493 A1 | 3/2007 | Issa | |
| 2007/0130015 A1 | 6/2007 | Starr et al. | |
| 2007/0157228 A1 | 7/2007 | Bayer et al. | |
| 2007/0198285 A1 | 8/2007 | Mottla et al. | |
| 2007/0204310 A1 | 8/2007 | Hua et al. | |
| 2007/0300152 A1 | 12/2007 | Baugher | |
| 2008/0082405 A1 | 4/2008 | Martinez et al. | |
| 2008/0112684 A1 | 5/2008 | Matsushita et al. | |
| 2008/0250449 A1 | 10/2008 | Torkos | |
| 2009/0076882 A1 | 3/2009 | Mei et al. | |
| 2009/0079871 A1* | 3/2009 | Hua et al. | 348/584 |

FOREIGN PATENT DOCUMENTS

| | | |
|---|---|---|
| KR | 20020010285 A | 2/2002 |
| KR | 20020010285 A | 2/2004 |
| KR | 20060073578 | 6/2006 |
| KR | 20060112841 | 11/2006 |
| KR | 20060114245 A | 11/2006 |
| WO | WO0133752 A1 | 5/2001 |
| WO | WO0180039 A2 | 10/2001 |
| WO | WO2005086081 A1 | 9/2005 |
| WO | WO2005086969 A2 | 9/2005 |

OTHER PUBLICATIONS

"AdBrite", retrieved on Apr. 26, 2007, at <<http://www.adbrite.com/mb/about_video.php>>, 1 pg.

"AdSense and Video Sites: A New Way to Make Money", retrieved on Nov. 5, 2007 at <<http://incomeblogs.blogspot. com/2006/12/adsense-and-video-sites-new-way-to.html>>, Dec. 3, 2006, 4 pgs.

"BritePic", retrieved on Apr. 26, 2007, at <<http://www.britepic.com/learnmore.php>>, Adbrite, 2007, pp. 1-2.

"Contextual In-Video Advertising: ScanScout", retrieved on 44/5/2007 at <<http://www.techcrunch.com/2007/05/14/contextual-in-video-advertising-scanscout/>>, May 14, 2007, 4 pgs.

Deng et al, "Unsupervised Segmentation of Color-Texture Regions in Images and Video," IEEE Transactions on Pattern Analysis and Machine Intelligence, vol. 23, No. 8, Aug. 2001, 27 pgs.

"Google AdWords Editorial Guidelines for Image Ads", retrieved on Apr. 26, 2007, at <<https://adwords.google.com/ select/imageguidelines.html>>, Google AdWords, 2006, pp. 1-9.

Hjelsvold, et al., "Web-based Personalization and Management of Interactive Video", found at <<http://delivery.acm.org/10.1145/380000/371969/p129-hjelsvold.pdf?key1=371969 &key2=7668361811&coll=GUIDE&dl=GUIDE &CFID=25387987&CFTOKEN=45755316>>, Proceedings of 10th Intl Conf on World Wide Web, 2001, pp. 129-139.

Hristova, et al., "Ad-me: Wireless Advertising Adapted to the User Location, Device and Emotions", Proceedings of the 37th Hawaii International Conference on System Sciences, IEEE, 2004, 10 pgs.

Hua et al, "Microsoft Research Asia TRECVID 2006: High-level Feature Extraction and Rushes Exploitation," TREC Video Retrieval Evaluation Online Proceedings, 2006, 9 pgs.

Hua et al., "Optimization-Based Automated Home Video Editing System", IEEE Transactions on Circuits and Systems for Video Technology, May 2004, vol. 14, Issue 5, 25 pgs.

Hua et al, "Personal Media Sharing and Authoring on the Web," ACM, MM'05, Singapore, Nov. 6-11, 2005, 4 pgs.

IBM E-Business Solutions, "Hitplay Media Streams Video into Dollars with WebSphere Application Server", Available at http://abf-dss.com/pdf/HitPlay1.pdf, 2000, 4 pgs.

Levin et al, "A Closed Form Solution to Natural Image Matting," In Proceedings of IEEE Computer Vision and Pattern Recognition, 2006, 10 pgs.

Liu et al, "Video Collage," In Proceedings of ACM International Conference on Multimedia, ACM, MM'07, Augsburg, Germany, Sep. 23-28, 2007, pp. 461-462.

Lu et al., "Content-Based Audio Classification and Segmentation by Using Support Vector Machines", Multimedia Systems, vol. 8, No. 6, Apr. 2003, pp. 482-491.

Ma et al., "A User Attention Model for Video Summarization", Proceedings 10th ACM Intl Conf on Multimedia, Dec. 2002, 10 pgs.

Ma et al, "User Attention Model based Video Summarization," IEEE Transactions on Multimedia Journal, 2005, 13 pgs.

Mei, et al., "Videosense: A Contextual Video Advertising System", at <<ttp://delivery.acm.org/10.1145/1300000/1291342/p463-mei.pdf?key1=1291342&key2=2633334911&coll=GUIDE&dl= &CFID=41780570&CFTOKEN=13059784, ACM, MM'07, Augsburg, Bavaria, Germany, Sep. 23-28, 2007, pp. 463-464.

Mei, et al., "Videosense: Towards Effective Online Video Advertising", at <<http://research.microsoft.com/%7Exshua/ publications/pdf/2007_ACMMM_VideoSense.pdf<<, ACM, MM'07, Augsburg, Bavaria, Germany, Sep. 23-28, 2007, 10 pgs.

Perez et al, "Poisson Image Editing," ACM Transactions on Graph, 2003, pp. 313-318.

Platt, "AutoAlbum: Clustering Digital Photgraphs Using Probabilistic Model Merging", IEEE Workshop on Content-Based Access of Images and Video Libraries, 2000, 6 pgs.

Qi et al., "Video Annotation by Active Learning and Cluster Tuning", 2006 Conf on Computer Vision and Pattern Recognition Workshop, Jun. 2006, 8 pgs.

Shi et al, "Normalized Cuts and Image Segmentation," IEEE Transactions on Pattern Analysis and Machine Intellience, vol. 22, No. 8, Aug. 2000, pp. 888-905.

Song et al., "An Automatic Video Semantic Annotation Scheme Based on Combination of Complementary Predictors", IEEE Intl Conf on Acoustics, Speech and Signal Processing, May 2006, 4 pgs.

Song et al., "Efficient Semantic Annotation Method for Indexing Large Personal Video Database", Proceedings 8th ACM Intl workshop on Multimedia Information Retrieval, Oct. 2006, pp. 289-296.

Song et al., "Semi-Automatic Video Annotation Based on Active Learning with Multiple Complementary Predictors", Proceedings 7th ACM SIGMM Intl Workshop on Multimedia Information Retrieval, Nov. 2005, pp. 97-103.

Song et al., "Semi-Automatic Video Semantic Annotation Based on Active Learning", Intl Conf on Visual Communications and Image Processing, Jul. 2005, 8 pgs.

Song et al., "Video Annotation by Active Learning and Semi-Supervised Ensembling", 2006 IEEE Intl Conf on Multimedia and Expo, Jul. 2006, pp. 933-936.
Tang et al., "To Construct Optimal Training Set for Video Annotation", Proceedings 14th Annual ACM Intl Conf on Multimedia, Oct. 2006, pp. 89-92.
Wan, et al., "Advertising Insertion in Sports Webcasts", found at <<http://infocomputer.org/portal/cms_docs_multimedia/multimedia/content/Promo/u2078_2007.pdf>>, IEEE, 2007, pp. 78-82.
Wang et al., "Automatic Video Annotation by Semi-Supervised Learning with Kernel Density Estimation", Proceedings 14th Annual ACM Intl Conf on Multimedia, Oct. 2006, pp. 967-976.
Wang et al., "Enhanced Semi-Supervised Learning for Automatic Video Annotation", 2006 IEEE Intl Conf on Multimedia and Expo, Jul. 2006, pp. 1485-1488.
Wang et al., "Semi-Supervised Kernel Regression", 6th IEEE Intl Conf on Data Mining, 2006, 6 pgs.
Weeks, "Web-Based Video Advertising Is Red Hot", Available at http://www.imediaconnection.com/content13544.asp, May 27, 2004, 4 pgs.
www.VibrantMedia.com, available at lease as early as Nov. 1, 2007, 4 pgs.
Yuan et al., "Automatic Video Genre Categorization Using Hierarchical SVM", 2006 IEEE Intl Conf on Image Processing, Oct. 2006, 4 pgs.
Yuan et al., "Manifold-Ranking Based Video Concept Detection on Large Database and Feature Pool", Proceedings 14th Annual ACM Intl Conf on Multimedia, Oct. 2006, pp. 623-626.
Zhang et al., "A New Shot Boundary Detection Algorithm", IEEE Pacific Rim Conf on Multimedia, 2001, 7 pgs.
Zhang et al., "Automatic Partitioning of Full-Motion Video", Multimedia Systems, vol. 1, No. 1, 1993, 19 pgs.
Zhao et al., "Video Shot Grouping Using Best-First Model Merging", Storage and Retrieval for Media Databases, 2001, 8 pgs.
Conheady, "PhotoShop Tutorial: Using Adjustment Layers and Masking", Retrieved on Feb. 25, 2011 at <<http://nyfalls.com/article-photoshop-adjustment-layers.html>>, copyright 2006 Matthew Conheady (v1.0), 5 pgs.
Elkin, "Microsoft's MSN Fattens Banners With Rich Media; Click-through Rates Double for Unilever's Dove in Ad Test", Crain Communications, Advertising Age, vol. 71, Sep. 2000, p. 52.
Lyons, et al., "Multimodal Interactive Advertising", In the Proceedings of the Workshop on Perceptual User Interfaces (PUI'98), Nov. 1998, 4 pgs.
Neatware.com, "Digital Signage", Retrieved on Feb. 25, 2011 at <<http://web.archive.org/web/20070827183554/ http://www.neatware.com/player/app_signage.html>>, 7 pgs.
Walker, et al., "The Impact of Comparative Advertising on Perception Formation in New Product Introductions", Association for Consumer Research, Advances in Consumer Research, vol. 13, 1986, 8 pgs.
Yan, "Basic PhotoShop Skill: Editing the Background", Retrieved on Feb. 1, 2011 at <<http://www.fubargenre.com/2007/04/01/basic-photoshop-skill-editing-the-background/>>, Apr. 1, 2007, 13 pgs.
The Beatroot, "Polish Plumber Gets the Sack", Available at <<http://beatroot_blogspot.com/2006/01/polish-plumber-gets-sack.html, Jan. 20, 2006, pp. 1-3.
Warhol Workboots, Tagllalatella Galleries, Retrieved on Oct. 15, 2010, <<http://www.bing.com/images/search?q=advertising+pictures+and+(positive+to+negative+(image+or+picture))&FORM=IGRE&qpvt=advertising+pictures+and+(positive+to+negative+(image+or+picture))#focal=f5ecc98fd70f615c3bf447ce5b13abf1&furl=http%3A%2F%2Fwww.djtfineart.com%2Fimages%2Fartwork%2Full%2FWarhol006.jpg--Warhol Workboots>>, 1 pg.
"Blinkx", retrieved on Nov. 18, 2008 at <<www.blinkx.com\wall>>, 1 pg.
Irani et al., "Mosaic Based Representations of Video Sequences and Their Applications", retrived on Nov. 18, 2008, <<http://ieeexplore.ieee.org/stamp/stamp.jsp?arnumber+466883&isnumber=9796>>, In Proceedings IEEE International Conference on Computer Vision, 1995, pp. 605-611.
Irani et al., "Video Indexing Based on Mosaic Representations", 1998 IEEE, vol. 86, No. 5, May 1998, 17 pgs.

Jia, et al, "Video Completion using Tracking and Fragment Merging", retrieved on Nov. 18, 2008, at <<http://ralph.cs.cf.ac.uk/papers/Geometry/videocompletion.pdf>>, The Visual Computer, vol. 21 : Sep. 8-10, 2005, 9 pgs.
Kang et al., "Correlated Label Propagation with Application to Multi-Label Learning", 2006 IEEE Computer Society Conf on Computer Vision and Pattern Recognition, 8 pgs.
Kang et al, "Space-Time Video Montage", retrived on Nov. 18, 2008, <<https://www.hwkang.com/files/CVPR06VideoMontage.pfd>>, Miscrosoft Research, Mar. 2006, CVPR (2), 8 pgs.
Ma et al., "A Generic Framework of User Attention Model and Its Application in Video Summarization", IEEE Transactions on Multimedia, vol. 7, No. 5, Oct. 2005, 13 pgs.
Magnor et al, "Spacetime-coherent Geometry Reconstruction from Multiple Video Streams", retrieved on Nov. 18, 2008, <<http://graphics.tu-bs.de/people/magnor/publications/3dpvt04.pdf>>, Proceedings 2nd Intl Symposium on 3D Data Processing, Visualization and Transmission, Sep. 2004, 3DPVT, 8 pgs.
Mei et al., "MSRA-USTC-SJTU at Trecvid 2007: High Level Feature Extraction and Search", TREC Video Retrieval Evaluation Online Proceedings, 2007, 12 pgs.
Mei et al., "VideoSense-Towards Effective Online Video Advertising", Proceedings 15th Intl conf on Multimedia, ACM, Sep. 2007, 10 pgs.
Ney et al., "Data Driven Search Organization for Continuous Speech Recognition", IEEE Transactions on Signal Processing, vol. 40, No. 2, Feb. 1992, 10 pgs.
Rabiner, "A Tutorial on Hidden Markov Models and Selected Applications in Speech Recognition" Proceedings IEEE, vol. 77, No. 2, Feb. 1989, 30 pgs.
Rav-Acha et al., "Making a Long Video Short: Dynamic Video Synopsis", Proceedings 2006 IEEE Computer Society Conf on Computer Vision and Pattern Recognition, 2006, 7 pg.
Rother et al., "AutoCollage", Proceedings ACM SIGGRAGPH, 2006, 6 pgs.
Smith et al., "Video Skimming and Characterization Through the Combination of Image and Language Understanding", IEEE 1998 Intl Workshop on Content-Based Access of Image and Video Databases, Jan. 3, 1998, 10 pgs.
Subrahmanian, et al, "The CPR Model for Summarizing Video", retrieved on Nov. 18, 2008,<<http://delivery.acm.org/10.1145/960000/951679/p2-fayzullin.pdf?key1=951679&key2=4658707221&coll=GUIDE&dl=GUIDE&CFID=1156313&CFTOKEN=25393126>>, Multimedia Tools and Applications, vol. 26, No. 2, Jun. 2005, 8 pgs.
Wang et al., "Video Collage: A Novel Presentation of Video Sequence", 2007 IEEE Intl Conf on Multimedia and Expo, Jul. 2007, 4 pgs.
Winn et al., "Object Categorization by Learned Universal Visual Dictionary", Proceedings 10th IEEE Intl Conf on Computer Vision, vol. 2, 2005, 8 pgs.
Yeung et al., "Video Visualization for Compact Presentation and Fast Browsing of Pictorial Content", IEEE Transactions on Circuits and Systems for Video Technology, vol. 7, No. 5, Oct. 1997, 15 pgs.
Office Action for U.S. Appl. No. 11/858,628, mailed on Aug. 18, 2011, Xian-Sheng Hua, "Advertisement Insertion Points Detection for Online Video Advertising", 12 pgs.
Office Action for U.S. Appl. No. 12/143,696, mailed on Aug. 19, 2011, Tao Mei, "Impressionative Multimedia Advertising", 30 pgs.
Office Action for U.S. Appl. No. 12/143,696, mailed on Dec. 6, 2011, Tao Mei, "Impressionative Multimedia Advertising", 23 pgs.
Office Action for U.S. Appl. No. 11/767,410, mailed on Mar. 1, 2012, Xian-Sheng Hua, "Image Advertising System", 20 pgs.
Office Action for U.S. Appl. No. 11/858,628, mailed on Mar. 1, 2012, Xian-Sheng Hua, "Advertisement Insertion Points Detection For Online Video Advertising", 17 pgs.
Non-Final Office Action for U.S. Appl. No. 11/626,251, mailed on Mar. 15, 2012, Xian-Sheng Hua et al., "Automatically Inserting Advertisements into Source Video Content Playback Streams", 13 pages.
Final Office Action for U.S. Appl. No. 12/143,696, mailed on May 3, 2011, Tao Mei et al., "Impressionative Multimedia Advertising", 29 pgs.

* cited by examiner

MULTI-VIDEO SYNTHESIS

BACKGROUND

The popularity of video capture devices and the Internet has caused a dramatic increase in the amount of online available video data as well as the number of video data users. As the technology of video presentation becomes more and more important, such technology may be used for summarizing videos for efficient browsing, automatic new video generation for marketing and gaming, as well as other applications.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Described herein are embodiments of various technologies for integrating one or more supplementary videos into one or more suitable space-time holes (i.e., insertion positions) within a main video. Suitableness is characterized by the least intrusive viewing experience. This integration process may take visual properties such as informativeness, consistency, and naturalness into consideration in the determination of suitability. In at least one embodiment, multi-video synthesis includes breaking a main video into a plurality of main frames and break a supplementary video into a plurality of supplementary frames. The multi-video synthesis also includes assigning one or more supplementary frames into each of a plurality of states of a Hidden Markov Model (HMM), with each of the plurality of states corresponding to one or more main frames. The multi-video synthesis further includes determining optimal frames in the plurality of main frames for insertion of the plurality of supplementary frames based on the plurality of states and visual properties. The main frames include optimal insertion positions. The multi-video synthesis additionally includes inserting the plurality of supplementary frames into the optimal insertion positions to form a synthesized video. Other embodiments will become more apparent from the following detailed description when taken in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

This disclosure is directed to embodiments that enable the integration of one or more supplementary videos into one or more suitable space-time holes within a main video. For example, one or more supplementary advertising videos may be integrated into a video or a video clip in a video game for the purpose of product or service promotion. The suitableness of a supplementary video that is integrated into the main video is characterized by the provision of a least intrusive viewing experience. The integration process to achieve least intrusive viewing experience may take visual properties such as informativeness, consistency, and naturalness into consideration.

The embodiments described herein are directed to technologies for achieving multi-video synthesis, that is, the integration of one or more supplementary videos into one or more suitable space-times holes within a main video. As described, the multi-video synthesis mechanisms may determine the suitability of an integration based on the intrusiveness of the one or more supplementary videos in the main video when the videos are observed together. In this way, the embodiments described herein may enable video content providers to maximize the delivery of video content and information in a limit time and/or content space. For example, the embodiments described herein may be used to integrate advertising videos into a primary video. Various examples of multi-video synthesis in accordance with the embodiments are described below with reference to FIGS. 1-7.

Exemplary Scheme

Figure 1:
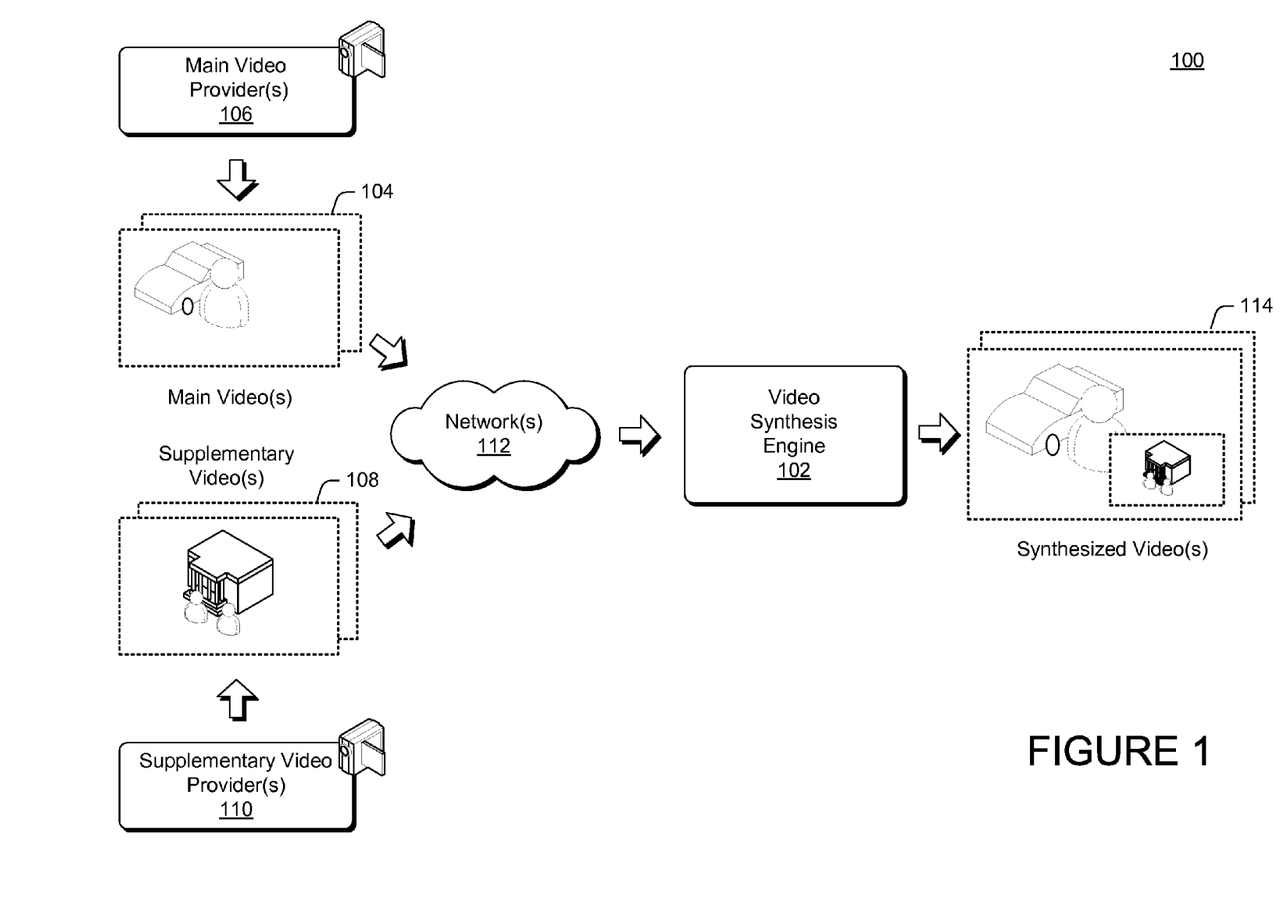
FIG. 1 shows a simplified block diagram that illustrates an exemplary multi-video synthesis process, in accordance with various embodiments.

FIG. 1 shows an exemplary multi-video synthesis system 100. A video synthesis engine 102 of the exemplary system 100 may receive one or more main videos 104 from main video providers 106. The main video providers 106 may include anyone who owns video content, and is willing to disseminate such video content to the general public. For example, the main video providers 106 may include professional as well as amateur artists. The one or more main videos 104 may include machine-readable works that contain a plurality of images, such as movies, video clips, homemade videos, etc.

The multi-video synthesis engine 102 of the exemplary system 100 may receive one or more supplementary videos 108 from supplementary video providers 110. The supplementary video providers 110 may include professional and amateur artists who are willing to disseminate video content to the public. In some embodiments, the one or more supplementary videos 108 may include one or more advertisements, that is, at least one image that is intended to generate viewer interest in particular goods, services, or points of view. The one or more supplementary videos 108 may also include machine-readable works that contain a plurality of images, such as movies, video clips, homemade videos, etc. In various embodiments, the durations of the one or more supplementary videos are generally shorter than the durations of the one or more main videos 104.

In the exemplary system 100, the one or more main videos 104 and the one or more supplementary videos 108 may be transferred to the video synthesis engine 110 via one or more networks 112. The one or more networks 112 may include at least one of wide-area networks (WANs), local area networks (LANs), and/or other network architectures. However, in other embodiments, the one or more main videos 104 and/or the one or more supplementary videos 108 may also reside within a memory of the video synthesis engine 110. Accordingly, in these embodiments, the video synthesis engine 110 may access the one or more main videos 104 and/or the one or more supplementary videos 108 without using the one or more networks 112.

The video synthesis engine 110 may be generally configured to integrate one of the main videos 104 with the one or more supplementary videos 108. According to various embodiments, the video synthesis engine 110 may integrate one or more supplementary videos 108 into suitable space-time holes in the particular main video 104. The integration of one or more supplementary videos 108 and the particular main video 104 may produced a synthesized video 114.

Suitableness of integration may be characterized by the provision of a least intrusive viewing experience following the integration. The video synthesis engine 110 may take visual properties such as informativeness, consistency, naturalness, and stability into consideration when determining suitability.

In various embodiments, the visual property of informativeness may facilitate minimizing the loss of space-time information from a main video 104 during the synthesis of a synthesized video 114. Accordingly, the use of informativeness may facilitate the selection of the space-time holes from the main video 104 by helping to locate least informative segments of the main video 104.

The visual property of consistency refers to whether the composed frames of a synthesized video 114 is consistent in appearance with the frames of the main video 104 and the supplementary videos 108. Accordingly, consistency may facilitate the insertion of one or more supplementary frames into a main frame based on the visual similarity between the frames.

The visual property of visual naturalness may refer to whether the connecting boundary areas between frames of the main video 104 and the one or more supplementary videos 108 are visually nature or smooth. Additionally, the visual property of stability may refer to whether the frames of the one or more supplementary videos 108 are presented continuously or orderly, and whether their spatial positions are stable relative to the main video 104 in the synthesized video 114.

Exemplary Components

Figure 2:
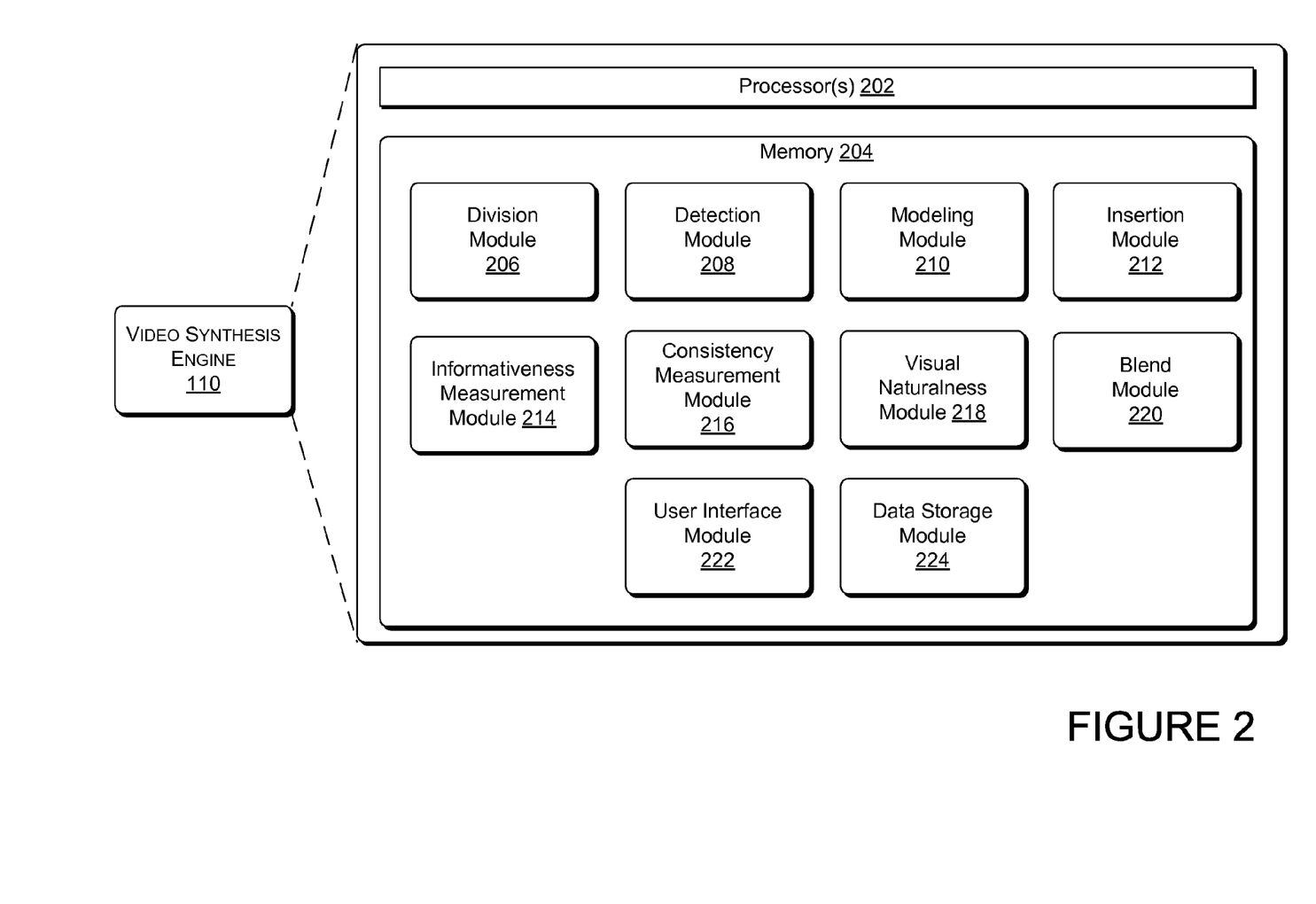
FIG. 2 shows a simplified block diagram that illustrates selected components of a video synthesis engine, in accordance with various embodiments.

FIG. 2 illustrates selected components of an exemplary video synthesis engine 110. The video synthesis engine 110 may include one or more processors 202 and memory 204. The memory 204 may include volatile and/or nonvolatile memory, removable and/or non-removable media implemented in any method or technology for storage of information, such as computer-readable instructions, data structures, program modules or other data. Such memory may include, but is not limited to, random accessory memory (RAM), read-only memory (ROM), electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system.

The memory 204 may store program instructions. The program instructions, or modules, may include routines, programs, objects, components, and data structures that perform particular tasks or implement particular abstract data types. The selected program instructions may include a detection module 208, a modeling module 210, an informativeness measurement module 210, a consistency measurement module 216, a visual naturalness module 218, a blend module 220, a user interface module 222, and a data storage module 224.

The division module 206 may be implemented to break one or more videos into frames. In various embodiments, the division module 206 may break a main video, such as main video 104, into its constituent video frames, which may be referred to as main frames. Likewise, the division module 206 may break a supplementary video, such as supplementary video 108, into its constituent frames, which may be referred to as supplementary frames.

The detection module 208 may be implemented to find the optimal insertion positions in main video 104 for the insertion of one or more supplementary videos 108. Optimal insertion positions may refer to spatial insertion positions that are spatially stable, or substantially spatially stable, that is, positions that enable the supplementary videos to be presented in a visually and continuously manner with the main video 104. In other words, the detection module 208 may determine the spatial-temporal positions of the region centers in the main video 104 and the corresponding supplementary frames that are to be simultaneously inserted into the regions. Accordingly, the detection module 208 may employ the division module 206 to break the main video 104 and the one or more supplementary videos 108 into frames. The detection module 208 may further measure the visual properties of the frames in a probabilistic form and formulate the detection of insertion holes as a Maximum a Posterior (MAP) problem, where the solution may determine a sequence of insertion positions for frames of each supplementary video 108. An exemplary probabilistic formulation for the detection of insertion holes is illustrated in FIG. 3.

Figure 3:
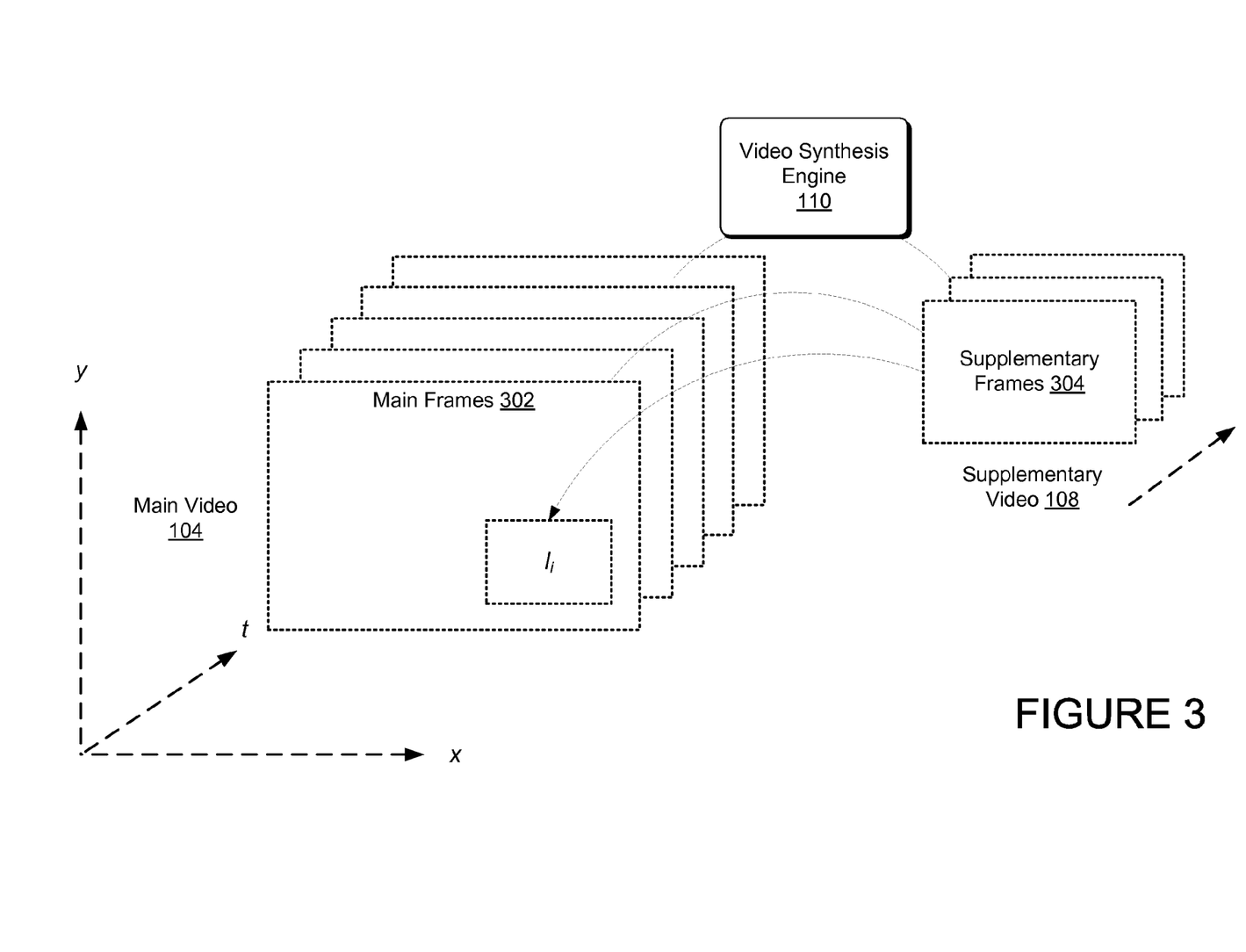
FIG. 3 illustrates an exemplary probabilistic formulation for the detection of supplementary video insertion holes in a main video, in accordance with various embodiments of multi-video synthesis.

FIG. 3 illustrates an exemplary probabilistic formulation for the detection of supplementary video insertion holes in a main video, in accordance with various embodiments. The main video 104 in FIG. 3 may be represented by $\{M_t\}_{t=1}^{T}$, by which the main video 104 contains main frames 302, also known as T frames, and (x,y) denote the spatial coordinates in each of the T frames.

Further, supplementary video 108 may be represented by $\{S_i\}_{i=1}^{T'}$, by which T' may represent the number of supplementary frames 304 in the supplementary video.

The detection module 208 may be configured to determine the optimal insertion positions $I=\{l_i\}_{i=1}^{T'}$ for frames $\{S_i\}$, where $l_i=(x_i, y_i, t_i)$ may be the position in (x, y, t) 3-dimensional space, and t may represent a time coordinate. If z represents the optimal properties of the synthesized video 114, and P(z) as the measurement of probability that the synthesized video 114 contains the desired properties, the detection module 208 may obtain optimal $I_i$ by maximizing a posterior probability:

$$l = \arg\max_{l} \prod_{i} P(z \mid l_i, S_i) P(l_i) \qquad (1)$$

-continued $$l = \arg\max_{l} \sum_{i} \{\log(P(z|l_i, S_i)) + \log(P(l_i))\} \quad (2)$$

Accordingly, the probability measurement for a single supplementary frame $S_i$ to be inserted to the position $I_i$ may be formulated as $P(z|l_i, S_i) \cdot P(l_i)$, whereby $P(l_i)$ is a model that defines informativeness. $P(z|l_i, S_i)$ may be the fitness measurement of the inserting frame $S_i$ to the area centering at $I_i$, which may be used for evaluating the properties of consistency and visual naturalness, given by:

$$\log(P(z|l_i, S_i)) = \log P^{con}(M_{ti}, S_i) + \lambda = \log P^{nat}(l_i, S_i) \quad (3)$$

whereby $M_{ti}$ may be the corresponding main video frame into which $S_i$ is integrated, and $\lambda$ may be a weighting parameter. $P^{con}(M_{ti}, S_i)$ may represent the measurement of the consistency between the two frames to be combined. $P^{nat}(I_i, S_i)$ measures the connecting naturalness of putting $S_i$ in the area defined by $I_i$.

The optimal insertion positions may maximize the likelihood defined in equation:

$$l = \arg\max_{l} \sum_{i} \{\log(P(z|l_i, S_i)) + \log(P(l_i))\} \quad (2)$$

while ensuring that the supplementary video 108 is inserted continuously and orderly into the main video 104. In various embodiments, to meet these criteria, the detection module 208 may be configured to search for an optimal insertion path, i.e., a series of insertion positions for the insertion of corresponding frames of a supplementary video 108 in the 3-dimensional video space of the main video 104. In these embodiments, each of the insertion positions may be in a corresponding to a frame in the main video 104.

In at least one embodiment, the detection module 208 may be configured to use the Viterbi algorithm, which is designed for finding an optimal sequence of states for the likelihood measurement. In the Viterbi algorithm process, a stability property may be considered by limiting the search paths' extension of spatial position.

Generally speaking, the Viterbi algorithm is a dynamic programming algorithm that discovers the most likely explanation of a hidden states sequence for an observation. The Viterbi algorithm is an efficient, recursive algorithm that performs an optimal exhaustive search along a time line. In the Viterbi algorithm, the computing of the most likely sequence up to a certain time point t depends only on the observation at point t, and the most likely sequence at point (t−1). Thus, the Viterbi method may search every possible path to yield global best results. However, since the number of possible paths increases exponentially as the length increases, the Viterbi method may cause heavy computation and storage loads for long sequential data.

Accordingly, in some embodiments, the detection module 208 may apply a beam search method, or a particular type of the Vertibi algorithm, that reduces the size of the search space during an optimal insertion path search. In at least one embodiment, the beam search method may define a pruning beam width $\Delta$ relative to the most probable path likelihood $P_{max}(t)$ at frame t. Thus, the beam search method may prune hypotheses that are outside of the pruning beam, i.e., with likelihoods less than $P_{max}(t) - \Delta$, from the search.

Figure 4:
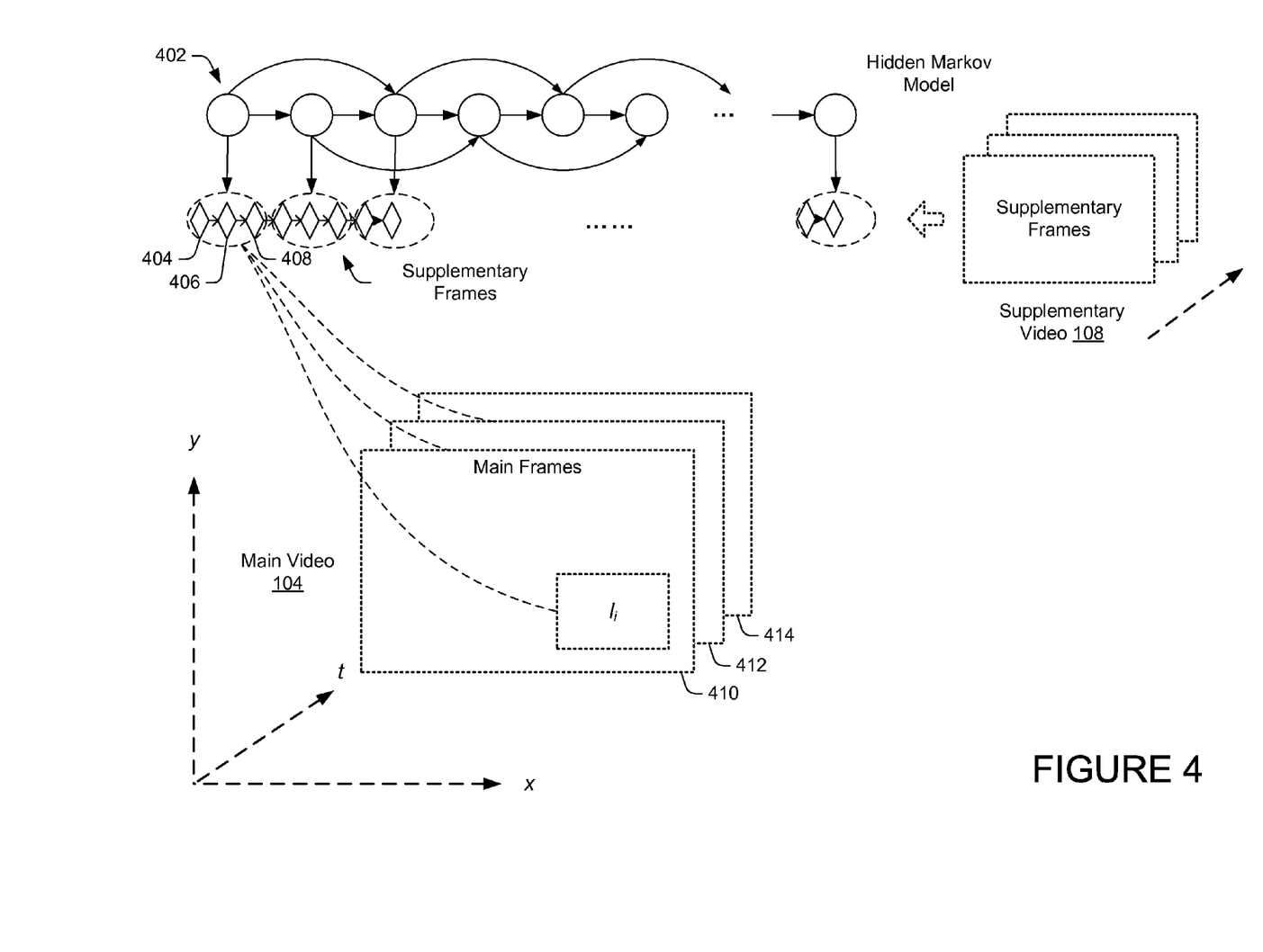
FIG. 4 illustrates the use of a Hidden Markov Model (HMM) to model a supplementary video, in accordance with various embodiments of multi-video synthesis.

Returning to the description of FIG. 2, the modeling module 210 may be employed by the detection module 208 to model one or more supplementary videos. In various embodiments, the modeling module 210 may model a supplementary video 108 using a discrete left to right Hidden Markov Model (HMM), which is illustrated in FIG. 4. Subsequently, the detection module 208 may apply a Viterbi algorithm to the HMM model of the supplementary video 108. In this way, the detection module 208 may use the Viterbi algorithm to find an optimal insertion path in the main video 104 for the insertion of the supplementary video 108.

FIG. 4 illustrates the use of a Hidden Markov Model (HMM) to model a supplementary video, such as the supplementary video 108, in accordance with various embodiments. During at least one embodiment of the HMM modeling, each state of the HMM model, such as state 402, may be assigned to three continuous supplementary frames of supplementary video 108 (FIG. 1), such as three continuous supplementary frames 404, 406, and 408.

Additionally, each state may also correspond to three insertion positions with the same spatial coordinates in three continuous main frames, such as frames 410, 406, and 408, of the main video 104 (FIG. 1). Because of the temporal continuous property of the main video 104, assigning a plurality of supplementary frames to one state has almost no influence on the fitness of various inserting paths. However, such an assignment may improve the efficiency of the video stability. It will be appreciated that in other embodiments, the number of supplementary frames assigned to each state, as well as the number of main frames that correspond to each state, may vary in the same manner (e.g., two assigned supplementary frames and two corresponding main frames), as long as the fitness of the inserting paths are not adversely affected.

In at least one HMM structure, if a current state is $\vec{S}_t$ the next candidate states to be inserted may be represented as $\vec{S}_{t+1}$ and $\vec{S}_{t+2}$. Accordingly, the transition probability may be represented as:

$$P(\vec{S}_t \to \vec{S}_{t+1}) = 1.0; P(\vec{S}_t \to \vec{S}_{t+2}) = 0.9 \quad (4)$$

Thus, some states may be jumped over. In this way, some parts of the supplementary video 108 that are inserted into the main video 104 may be accelerated, and better visual effects may be achieved without the loss of information from the supplementary video 108.

Accordingly, to find the insertion positions for the HMM states sequence, the detection module 208 may extend possible paths along a time line of the main video 104. Each path X may contain a historic list of the insertion positions $\{I_t\}$ and a historic list of states $\{\vec{S}_t\}$. The probability of the path $X_t$ up to state t whose state $\vec{S}_t$ may be assigned to a position $I_t$ is:

$$P(X_t = (l_t, \vec{S}_t)) = \max_{X_{t-1}} \{P(X_{t-1} \to (l_t, \vec{S}_t)) P(z|l_t, S_i) P(l_t) + P(X_{t-1})\} \quad (10)$$

where $X_{t-1}$ is the path at state (t−1) whose likelihood is $P(X_{t-1})$ and $P(X_{t-1} \to (I_t, \vec{S}_t))$ is the transition probability of extending to the next state to $(I_t, \vec{S}_t$ and where $S_i$ denotes the current corresponding frames of the supplementary video 102.

At each possible insertion position, the detection module 208 may initialize the paths from the beginning state of the supplementary video 108. Paths that reach the end of the supplementary video 108 may be saved to the output and deleted from the current path list. Finally, the path with the highest likelihood in the output list may be obtained as the optimal solution.

In order to implement the spatial stability property of the synthesized video 114, the detection module 208 may limit the HMM state extension of $\{I_i\}$ in a spatial neighboring area of a current position. Lower transition probabilities may be set to farther positions in the neighborhood and vice versa while probability for the same position may be maximized.

In various embodiments, the detection module 208 may keep only a path list of the current frame in a memory (e.g., data storage module 220). For example, for a T'-frame supplementary video, which has $N_s$ states, and a T-frame main video that has L possible insertion positions in each frame, the maximal paths number that the detection module 208 may need to keep is ($N_s$·L). If the number of extension candidates for a state is limited to E, the size of paths searching space may be at most ($N_s$·L·E). Thus, computation in accordance with these embodiments is generally efficient and practical for long videos and online video processing.

Returning to the description of FIG. 2, the insertion module 212 may be employed to insert supplementary frames of a supplementary video, such as the supplementary video 108, into one or more main frames of the main video 108. Accordingly, once the optimal insertion positions in the optimal frames are determined by the detection module 208, the detection module 208 may activate an insertion module 212 to integrate the supplementary video 108 into the main video 104.

The informativeness measurement module 210 may be employed by the detection module 208 to minimize the loss of information from the main video 104 when one or more supplementary videos 108 are inserted in the main video 104. In at least one embodiment, the informativeness is a probability factor for insertion positions $I_i$ defined in terms of the saliency measurement $P^{sal}(I_i)$ and the smoothness measurement $P^{smo}(I_i)$, as shown below:

$$P(l_i) = P^{sal}(l_i) \cdot P^{smo}(l_i) \tag{5}$$

To minimize the informational loss of the main video 104 and the intrusiveness of the supplemental video insertion, highly smooth areas may be provided more insertion while areas containing salient parts may be provided with less insertion.

To measure the saliency and smoothness of the insertion area defined by a particular position in a frame, the informativeness measurement module 210 may first calculate a saliency map for each main frame 302 (FIG. 3) using a visual attention model that combines static and temporal saliency maps. In various embodiments, the static contrast-based saliency map may be configured to investigate the effects of contrast in human perception, while the temporal saliency map may integrate the motion inductors.

The saliency measurement of $I_i$ may be calculated over the insertion area centering at a particular position in a frame. Since high saliency of even a small part of this area causes information loss, the informativeness measurement module 214 may measure this informativeness using the highest J saliency value in the area.

In at least one embodiment, J may be defined as ⅛ of the area size according to viewing experience, and $\{l_j\}_{j=1,\ldots,J}$ may be defined as the highest J saliency values, where $I_j$ ranges over (0 255), as shown below:

$$P^{smo}(l_i) = 1 - \sum_{j=1}^{J} \frac{l_j}{255 \times J} \tag{6}$$

High saliency indicates there is almost no salient part in this area. Since the saliency map also contains the region segmentation information, the smoothness measurement for $I_i$ can be defined using all the saliency values in the inserting area $I = \{l_j\}_{j=1,\ldots,8J}$:

$$P^{smo}(l_i) = \exp\left\{-\frac{\sqrt{\text{var}(I)}}{255}\right\} \tag{7}$$

whereby var(I) is the variance of vector I. Accordingly, high $P^{smo}$ generally means that the insertion area defined by $I_i$ is quite smooth and less informative.

The consistency measurement module 216 may be employed by the detection module 208 to compute the consistency between a main video 104 and one or more supplemental videos 108. In various embodiments, the consistency measurement module 216 may use the combination of color similarity $P^{ccon}(M_{ti}, S_i)$ and texture similarity $P^{tcon}(M_{ti}, S_i)$ to measure the consistency between a main frame, Mti, of the main video 104, and a supplementary frame, $S_i$, of a supplementary video 108:

$$P^{con}(M_{t_i},S_i) = P^{ccon}(M_{t_i},S_i) \cdot P^{tcon}(M_{t_i},S_i) \tag{8}$$

The color similarity may be calculated using the color histogram correlation. For each pixel of color (R,G,B), the consistency measurement module 216 may calculate the pixel's chromaticity color [g, b]=[16×G/R+G+B, 16×G/R+G+B], based on which a 16×16 color histogram $H_M$ for a main frame and $H_S$ for a supplementary frame can be obtained by accumulating the points. Accordingly, the color relevance likelihood may be obtained by:

$$P^{con}(M_{t_i}, S_i) = \frac{\sum_{i=1}^{16}\sum_{j=1}^{16} H_M(i,j) H_S(i,j)}{\sqrt{\sum_{i=1}^{16}\sum_{j=1}^{16} H_m(i,j)^2} \sqrt{\sum_{i=1}^{16}\sum_{j=1}^{16} H_s(i,j)^2}} \tag{9}$$

For texture following a texton histogram representation, a set of filter-banks may be applied to each frame using the intensity value of each pixel. The filter-banks may include three Gaussians (with the scale parameter σ=1, 2, 4), four Laplacian of Gaussians (with σ=1, 2, 4, 8), and four order-1 derivatives of Gaussians (with σ=2, 4 and x, y directions). Therefore, each pixel may be associated with an 11-dimensional texture feature vector. In various embodiments, the consistency measurement module 216 may be provided with random selected training pixel features from the main frames that are clustered to a vocabulary of texton by k-means. By mapping each pixel to one texton in the vocabulary and accumulating, a texton histogram may be obtained for each frame. Additionally, the texture relevance $P^{tcon}(M_{ti}, S_i)$ may be calculated using the same histogram correlation method as used for color relevance.

The visual naturalness module 218 may be employed by the detection module 208 to ensure that the connecting boundary areas across different videos are visually natural or smooth. Inconsistent appearance between connecting boundaries of the main video 104 and the supplementary video 108 in the synthesized video 114 may cause visual unnaturalness. Accordingly, the visual naturalness module 218 may minimize the contrast between the connecting boundary area of a main frame and a supplementary frame in each synthesized frame of the synthesized video 114. The naturalness can be evaluated by judging the consistency in appearance between first area of a main frame and a second area of a supplementary frame that are adjacent a connecting boundary. An example of the areas of the main frame and the supplementary frame is shown in FIG. 5a.

Figure 5A:
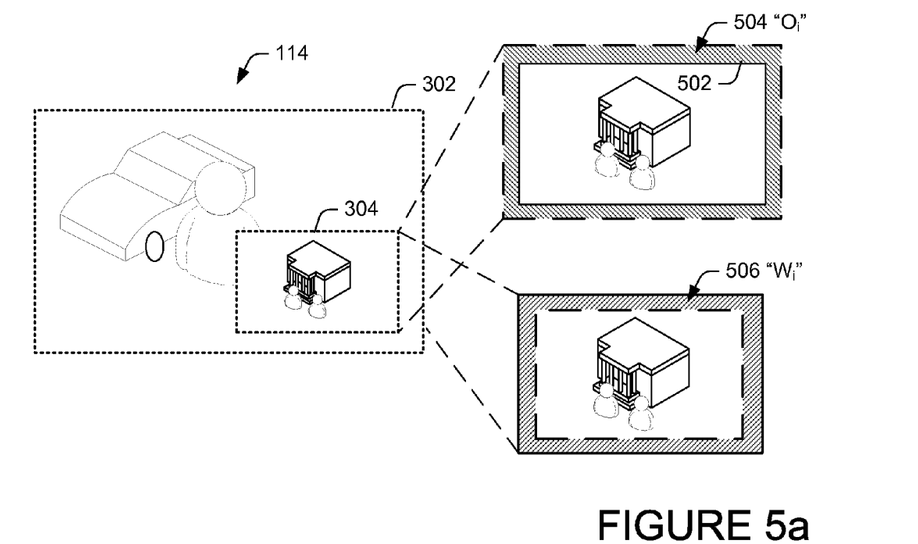
FIGS. 5a and 5b illustrate examples of connecting boundary areas between an inserted supplementary frame and a main frame, in accordance with various embodiments of multi-video synthesis.

FIG. 5a shows examples of connecting boundary areas between an inserted supplementary frame and a main frame, in accordance with various embodiments. As shown, the synthesized frame 114 includes a supplementary frame 304 that is inserted into a main frame 302. Boundary 502 is the connecting boundary between the supplementary frame 108 and the main frame 102. The area 504, designated as area "O", is a boundary area that is immediately outside the boundary 502. Likewise, the area 506, designated as area "W", is a boundary area that is immediately inside the boundary 502. Accordingly, the visual naturalness module 218 may define visual naturalness based on the consistency of area O and W.

Figure 5B:
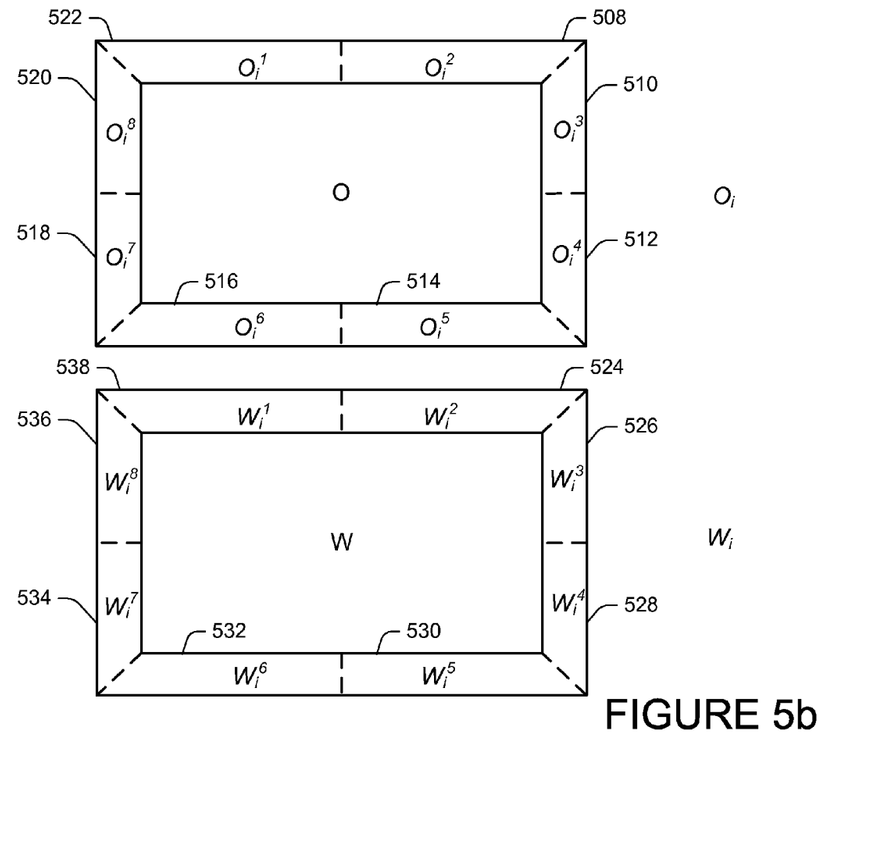

As shown in FIG. 5b, to consider the naturalness in different directions of the inserting area, the visual natural module 212 may evenly divide each of the boundary areas $O_i$ and $W_i$ into eight sub areas $\{O_i^j\}_{j=1}^8$ and $\{W_i^j\}_{j=1}^8$, respectively. The boundary areas of $O_i$ are illustrated as areas 508-522, and the boundary areas of $O_i$ are illustrated as areas 524-538.

The visual naturalness module 218 (FIG. 2) may extract color and texture features from each of the sub areas and consistency may be measured between a corresponding sub inside area $W_i$ and sub outside area $O_i$. In various embodiments, the visual naturalness module 218 may further use the same feature extraction and relevance calculation methods as the consistency measurement module 216. Accordingly, based on supplementary frame $S_i$ and insertion position $I_i$, the visual naturalness module 218 may obtain the naturalness measurement $P^{nat}(I_i, S_i)$ by summing the consistency measurements of the sub areas:

$$P^{nat}(S_i, I_i) = \sum_{j=1}^{J} P^{con}(O_i^j, W_i^j)/8 \qquad (10)$$

whereby the method for calculating $P^{con}$ may be defined as:

$$P^{con}(M_{t_i}, S_i) = \frac{\sum_{i=1}^{16}\sum_{j=1}^{16} H_M(i,j) H_S(i,j)}{\sqrt{\sum_{i=1}^{16}\sum_{j=1}^{16} H_m(i,j)^2} \sqrt{\sum_{i=1}^{16}\sum_{j=1}^{16} H_s(i,j)^2}} \qquad (11)$$

Accordingly, if a part of the inserting region boundary is the boundary of the main frame, the consistency measurement of sub areas along this boundary may be set to a relative high value since the overlapped boundary does not bring any visual intrusiveness.

It will be appreciated that while the previously described techniques for multi-video synthesis are described with respect to frames from a single main video 104 and a single supplementary video 108, the techniques may be applied to the insertion of a plurality of supplementary videos 108 into a main video 104. In such embodiments, the detection module 208 may keep an individual path for each supplementary video 108 when searching along the time lines. Accordingly, the detection module 208 may compute an optimal solution with no overlap between the inserting paths of different supplementary videos and compute the relative highest overall likelihood.

Further, the blend module 220 may be employed by the detection module 208 to enhance the appearance of the synthesized video 114 that includes main video 104 and one or more supplemental videos 108. To this end, the blend module 220 may implement a seamless blending algorithm to create smooth transitions in a frame of a synthesized video 114 that includes a main frame from main video 104, and a supplementary frame from supplementary video 108. In various embodiments, the blending algorithm may use a probabilistic matting approach for videos. Specifically, the blending algorithm may be applied on an extended area which covers both an insertion area and its neighboring area. For example, For each pixel e, a vector $\{P_e(M), P_e(S)\}$ may represent a probability the pixel belongs to a main frame and supplementary frame. The output value of this pixel may be obtained by:

$$e = P_e(M)^* e_M + P_e(M) + P_e(S) = 1 \qquad (12)$$

whereby $e_M$ and $e_S$ represent the corresponding pixel value in the original main frame and supplementary frame respectively. It will be appreciated that in each blending step, only a main frame and a supplementary frame are processed. Accordingly, frames from different supplementary videos can be inserted one by one by using the previous integrated frame as the main frame. The blend module 114 may take an iterative process to distribute each pixel's probabilities equally to its four-connected neighboring pixels, so that the neighboring pixels are driven have a similar probability vector. The resulted probabilities may be used as alpha values for alpha matting between the inserted supplementary frame and the extended inserting area of the main frame.

In at least one embodiment, the probability that a pixel belongs to the supplementary frame $P_e(S)$, may be associated according to its information, i.e., saliency value in the supplementary video. In such an embodiment, the probability $P_e(S)$ is set to 1 if its saliency value $I_e$ is above a threshold Th, or $$\frac{I_e}{Th}$$

if its saliency is not set to 1.

Returning to the description of FIG. 2, the user interface module 222 may interact with a user via a user interface (not shown). The user interface may include a data output device such as a display, and one or more data input devices. The data input devices may include, but are not limited to, combinations of one or more of keypads, keyboards, mouse devices, touch screens, microphones, speech recognition packages, and any other suitable devices or other electronic/software selection methods.

The user interface module 222 may be configured to enable a user to provide input to select one or more supplementary videos 108 for integration with a main video 104 to create a synthesized video 114. Additionally, the user interface module 222 may be further configured to cause the display to output synthesized videos, such as the synthesized video 114, to the user.

The data storage module 224 may be configured to store data in a portion of memory 204 (e.g., a database). In various embodiments, the data storage module 224 may be configured to store one or more main videos 104 and one or more supplementary videos 108. The data storage module 224 may also be configured to store the synthesized videos derived from the main videos 104 and supplementary videos 108, such as any intermediary products produced by the various modules of the video synthesis engine 110.

Exemplary Process

Figure 6:
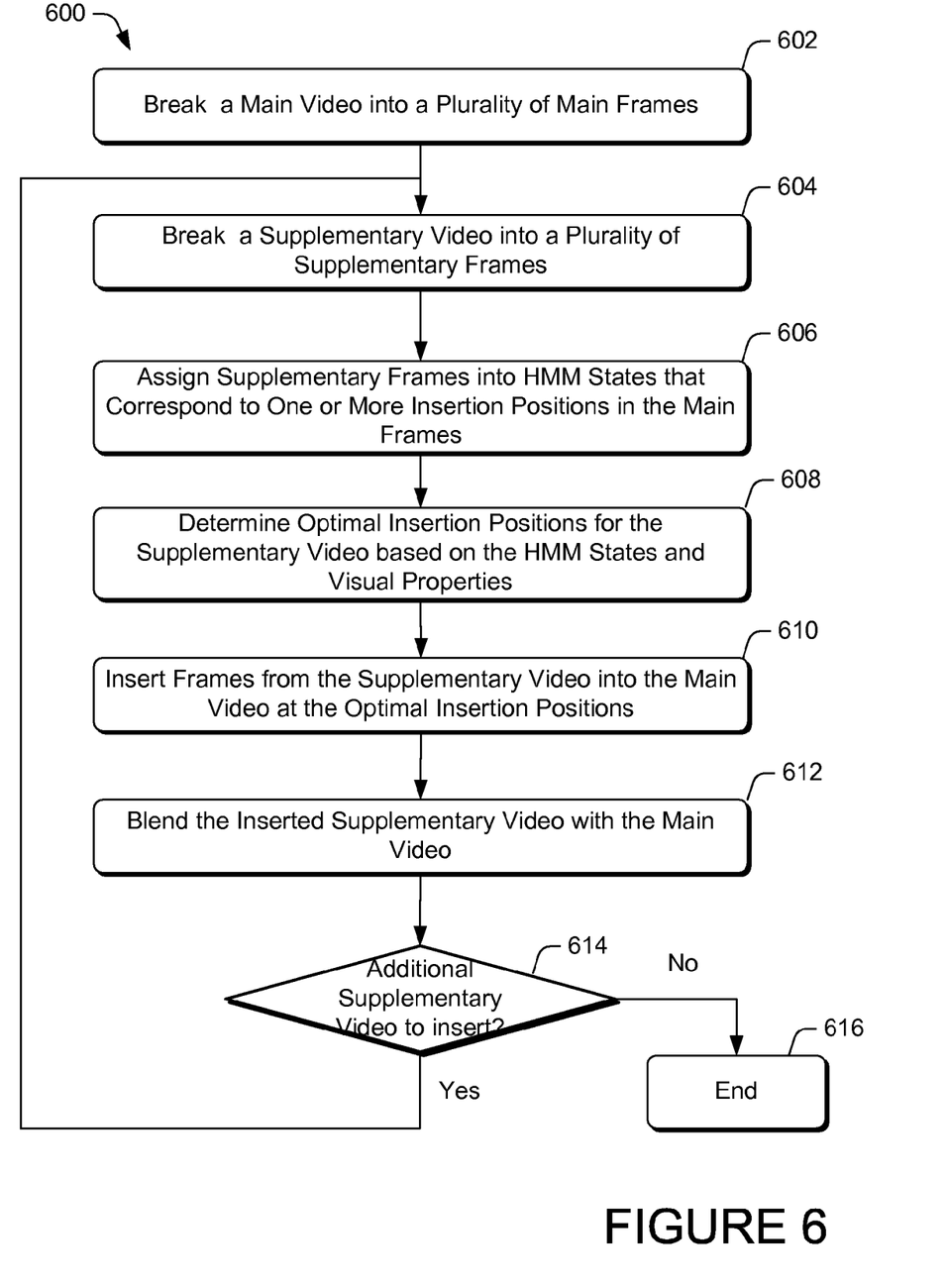
FIG. 6 illustrates an exemplary process 600 that facilitates integration of one or more supplementary videos with a main video, in accordance with various embodiments of multi-video synthesis.

FIG. 6 illustrates an exemplary process 600 that facilitates integration of one or more supplementary videos with a main video, in accordance with various embodiments. The exemplary process in FIG. 6 is illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process is described with reference to the exemplary video synthesis engine 110 of FIG. 1, although it may be implemented in other system architectures.

At block 602, the video synthesis engine 110 may break a main video, such as a main video 104, into a plurality of main frames. At block 604, the video synthesis engine 100 may also break a supplementary video, such as a supplementary video 108, into a plurality of supplementary frames.

At block 606, the video synthesis engine 110 may assign supplementary frames of the supplementary video 108 to states in a Hidden Markov Model (HMM). In at least one embodiment, each state in the HMM may be assigned to three continuous supplementary frames. The states in the HMM may be assigned in this manner until all supplementary frames in the supplementary video are paired with a particular state.

In other embodiments, each state in the HMM may be assigned to any number of supplementary frames as long as the number of supplementary frames does not affect the fitness of inserting paths, e.g., a series of insertion position in the main 3-dimensional space (i.e., x, y, and t) of the main video 104.

Each state of the HMM may also correspond to insertion positions in the main video 104, where each of the corresponding insertion positions being in a main frame of the video 104. The corresponding insertion positions may share the same spatial coordinates (i.e., x and y coordinates) in the main frames. In various embodiments, the main frames that include the insertion positions for each state are continuous and the number of insertion positions is equal to the number of supplementary frames assigned to the state. For example, in the embodiment where each state of the HMM is assigned three continuous supplementary frames, each state of the HMM may also correspond to three continuous main frames in the main video 104, where each main frame includes an insertion position.

At block 608, the video synthesis engine 110 may determine the optimal insertion positions in the optimal frames, in the main video 104 for the insertion of the supplementary frames of the supplementary video 108. In various embodiments, the video synthesis engine 110 may apply a Vertibi algorithm (e.g., beam search algorithm) to the HMM states of the supplementary video 108 and corresponding insertion positions in the main video 104. In various embodiments, the Viterbi algorithm may be applied by the video synthesis engine 110 to find an optimal insertion path in the main video 104 that enable the insertion of the supplementary video 104 into the main video 104 to achieve the least intrusive viewing experience. The optimal insertion path in the main video 104 including optimal insertion positions for the frames of the supplementary video 108.

Accordingly, the video synthesis engine 110 may achieve this least intrusive viewing experience by accounting for visual properties that includes informativeness, consistency, visual naturalness, and stability through the application of the Viterbi algorithm. In at least one embodiment, the Vertibi algorithm may be a Vertibi beam search method.

At block 610, following the determination of the optimal insertion path by the video synthesis engine 110, the engine 110 may insert the frames of the supplementary video 108 into the main video 104 at the optimal insertion positions, that is, optimal frames. The optimal insertion positions being designated by the optimal insertion path.

At block 612, the video synthesis engine 110 may blend the supplementary frames that are inserted into corresponding main frames of the main video 104. In various embodiments, the blending algorithm may use a probabilistic matting approach. Thus, the video synthesis engine 110 may produce a synthesis video, such as synthesized video 114, from the main video 104 and supplementary video 108.

At decision block 614, the video synthesis engine 110 may determine whether there is an additional supplementary video 108 to be inserted into the main video 104. If the video synthesis engine 110 determines that there is an additional supplementary video 108 for insertion, ("yes" at decision block 614), the process 600 may loop back to block 604, where the video synthesis engine 110 may repeat the integration. However, if the video synthesis engine 110 determines that there is no additional supplementary video 108 to be inserted ("no" at decision block 614), the process 600 may terminate at block 616.

Nevertheless, it will be appreciated that in some embodiments, the integration of multiple supplementary videos 108 into the main video 104 may be carried out simultaneously rather than sequentially. In such embodiments, the video synthesis engine 110 may keep an individual path for each supplementary video 108 when searching along the time lines. Accordingly, the video synthesis engine 110 may compute an optimal solution with no overlap between the inserting paths of different supplementary videos and compute the relative highest overall likelihood.

Exemplary Computing Environment

Figure 7:
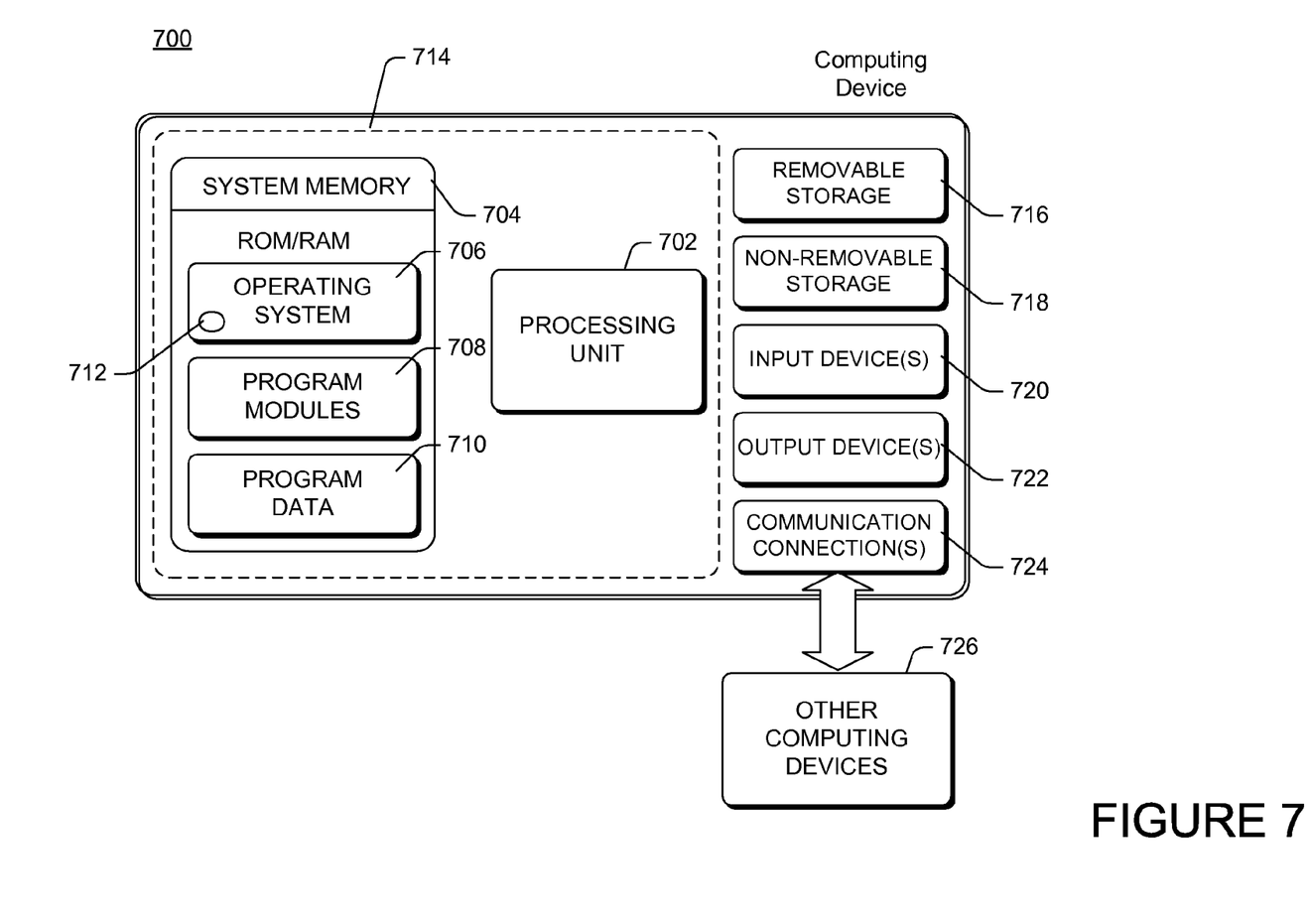
FIG. 7 shows a block diagram illustrating a representative computing device on which multi-video synthesis operations, in accordance with various embodiments, may be implemented.

FIG. 7 illustrates a representative computing environment 700 that may be used to implement techniques and mechanisms for multi-video synthesis, in accordance with various embodiments described herein. The video synthesis engine 110, as described in FIG. 1, may be implemented in the computing environment 700. However, it will readily appreciate that the techniques and mechanisms may be implemented in other computing devices, systems, and environments. The computing environment 700 shown in FIG. 7 is only one example of a computing device and is not intended to suggest any limitation as to the scope of use or functionality of the computer and network architectures. Neither should the computing environment 700 be interpreted as having any dependency or requirement relating to any one or combination of components illustrated in the example computing device.

In a very basic configuration, computing device 700 typically includes at least one processing unit 702 and system memory 704. Depending on the exact configuration and type of computing device, system memory 704 may be volatile (such as RAM), non-volatile (such as ROM, flash memory, etc.) or some combination of the two. System memory 704 typically includes an operating system 706, one or more program modules 708, and may include program data 710. The operating system 706 includes a component-based framework 712 that supports components (including properties and events), objects, inheritance, polymorphism, reflection, and provides an object-oriented component-based application programming interface (API), such as, but by no means limited to, that of the .NET™ Framework manufactured by the Microsoft Corporation, Redmond, Wash. The device 700 is of a very basic configuration demarcated by a dashed line 714. Again, a terminal may have fewer components but will interact with a computing device that may have such a basic configuration.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by removable storage 716 and non-removable storage 718. Computer storage media may include volatile and nonvolatile, removable and non-removable media implemented in any method or technology for storage of information, such as computer readable instructions, data structures, program modules, or other data. System memory 704, removable storage 716 and non-removable storage 718 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 720 such as keyboard, mouse, pen, voice input device, touch input device, etc. Output device(s) 722 such as a display, speakers, printer, etc. may also be included. These devices are well known in the art and are not discussed at length here.

Computing device 700 may also contain communication connections 724 that allow the device to communicate with other computing devices 726, such as over a network. These networks may include wired networks as well as wireless networks. Communication connections 724 are some examples of communication media. Communication media may typically be embodied by computer readable instructions, data structures, program modules, etc.

It is appreciated that the illustrated computing device 700 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

The least intrusive integration of one or more supplementary videos into a main video may enable the production of a synthesize video that conveys the maximum amount of information in a relatively short period of time. Thus, embodiments in accordance with this disclosure may provide synthesized videos that may be used for product or service promotion in video clips and video games, as well other information presentation purposes.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A system, comprising:
a division component to break a main video into a plurality of main frames, and to break a supplementary video into a plurality of supplementary frames;
a modeling component to assign one or more supplementary frames into each of a plurality of states of a Hidden Markov Model (HMM), and correspond each of the plurality of states to one or more of the plurality of main frames;
a detection component to select particular frames in the plurality of main frames via a Viterbi beam search for an insertion path based on the plurality of states and visual properties, the particular frames including specific insertion positions for insertion of the plurality of supplementary frames;
an insertion component to insert the plurality of supplementary frames into the specific insertion positions to form a synthesized video; and
a blend component to blend the inserted supplementary frames and the particular frames of the synthesized video.

2. The system of claim 1, further comprising:
an informativeness measurement component to compute expected losses of information from the plurality of the main frames due to insertion of the plurality of the supplementary frames,
wherein the visual properties include the expected losses computed by the informativeness measurement component.

3. The system of claim 1, further comprising:
a consistency measurement component to compute expected visual consistencies between the plurality of the main frames and the plurality of the supplementary frames,
wherein the visual properties include the expected visual consistencies computed by the consistency measurement component.

4. The system of claim 1, further comprising:
a visual naturalness component to compute expected visual naturalness between a first boundary areas in the plurality of the main frame and a second boundary areas in the plurality of supplementary frames,
wherein the visual properties include the expected visual naturalness computed by the visual naturalness component.

5. The system of claim 1, wherein the insertion path includes spatially stable insertion positions that correspond to the particular frames.

6. The system of claim 1, wherein the blend component is to blend the inserted supplementary frames and the particular frames using probabilistic matting.

7. The system of claim 1, wherein the detection component is to determine the particular frames by formulating insertion of the plurality of the supplementary frames into the particular frames as a Maximum a Posterior (MAP) problem.

8. The system of claim 1, wherein the detection component is to determine the particular frames by treating each of the main frames and each of the supplementary frames as including two spatial coordinates and a time coordinate.

9. A computer readable memory storing computer-executable instructions that, when executed, cause one or more processors to perform acts comprising:

breaking a main video into a plurality of main frames and break a supplementary video into a plurality of supplementary frames;

assigning one or more supplementary frames into each of a plurality of states of a Hidden Markov Model (HMM), each of the plurality of states corresponding to one or more main frames;

determining particular frames that include specific insertion positions in the plurality of main frames for insertion of the plurality of supplementary frames by performing a Viterbi beam search for an insertion path based on the plurality of states and visual properties; and inserting the plurality of supplementary frames into the specific insertion positions to form a synthesized video.

10. The computer readable memory of claim 9, wherein the insertion path includes spatially stable insertion positions that correspond to the particular frames.

11. The computer readable memory of claim 9, wherein the computer-executable instructions, when executed, further cause the one or more processors to perform acts comprising computing expected losses of information from the plurality of the main frames due to insertion of the plurality of the supplementary frames, wherein the visual properties include the expected losses.

12. The computer readable memory of claim 9, wherein the computer-executable instructions, when executed, Further cause the one or more processors to perform acts comprising computing expected visual consistencies between the plurality of the main frames and the plurality of the supplementary frames, wherein the visual properties include the expected visual consistencies.

13. The computer readable memory of claim 9, wherein the computer-executable instructions, when executed, further cause the one or more processors to perform acts comprising computing expected visual naturalness between the first boundary areas in the plurality of the main frame and the second boundary areas in the plurality of supplementary frames, wherein the visual properties include the expected visual naturalness.

14. The computer readable memory of claim 9, wherein the computer-executable instructions, when executed, further cause the one or more processors to perform acts comprising blending the inserted supplementary frames and the particular frames of the synthesized video using probabilistic matting.

15. A method, comprising:

breaking a main video into a plurality of main frames and break a supplementary video into a plurality of supplementary frames;

assigning one or more supplementary frames into each of a plurality of states of a Hidden Markov Model (HMM), each of the plurality of states corresponding to one or more main frames;

determining particular frames that include specific insertion positions in the plurality of main frames for insertion of the plurality of supplementary frames based on the plurality of states and visual properties, the visual properties including informativeness, consistency, and naturalness;

inserting the plurality of supplementary frames into the specific insertion positions to form a synthesized video; and blending the inserted supplementary frames and the particular frames of the synthesized video using probabilistic matting.

16. The method of claim 15, further comprising obtaining the informativeness visual property by computing expected losses of information from the plurality of the main frames due to insertion of the plurality of the supplementary frames.

17. The method of claim 15, further comprising obtaining the consistency visual property by computing expected visual consistencies between the plurality of the main frames and the plurality of the supplementary frames.

18. The method of claim 15, further comprising obtaining the visual naturalness visual property by computing expected visual naturalness between the first boundary areas in the plurality of the main frame and the second boundary areas in the plurality of supplementary frames.

19. The method of claim 15, wherein the insertion path includes spatially stable insertion positions that correspond to the particular frames.

* * * * *